United States Patent [19]

King et al.

[11] Patent Number: 5,652,907

[45] Date of Patent: *Jul. 29, 1997

[54] HIGH SPEED MASK AND LOGICAL COMBINATION OPERATIONS FOR PARALLEL PROCESSOR UNITS

[75] Inventors: Edward C. King, Pleasanton; Alan G. Smith, Dublin, both of Calif.

[73] Assignee: CPU Technology, Inc., Fremont, Calif.

[*] Notice: The term of this patent shall not extend beyond the expiration date of Pat. No. 5,499,376.

[21] Appl. No.: 470,675

[22] Filed: Jun. 6, 1995

Related U.S. Application Data

[63] Continuation of Ser. No. 163,460, Dec. 6, 1993, Pat. No. 5,499,376.

[51] Int. Cl.$^6$ .............................. G06F 13/00; G06F 15/16
[52] U.S. Cl. .................... 395/800; 395/376; 364/931.41; 364/933; 364/940.2; 364/940.5; 364/229; 364/229.2; 364/229.3; 364/240.1; 364/244.4; 364/247; 364/252.5; 364/259; 364/259.1; 364/259.7; 364/DIG. 1
[58] Field of Search .................................. 395/800, 375, 395/325, 88.5, DIG. 1, DIG. 2; 364/DIG. 1, DIG. 2

[56] References Cited

U.S. PATENT DOCUMENTS

| | | | |
|---|---|---|---|
| 3,980,992 | 9/1976 | Levy et al. | 340/172.5 |
| 4,493,053 | 1/1985 | Thompson | 395/250 |
| 4,933,839 | 6/1990 | Kinoshita et al. | 395/200 |
| 4,992,933 | 2/1991 | Taylor | 395/800 |
| 5,167,029 | 11/1992 | Eikill et al. | 395/425 |
| 5,218,713 | 6/1993 | Hammer et al. | 395/800 |

*Primary Examiner*—Meng-Al T. An
*Attorney, Agent, or Firm*—Townsend and Townsend and Crew

[57] ABSTRACT

A computer system having a plurality of parallel processor units with each processor unit having an output bus of n bits and an associated mask register is provided. The computer system comprises a bus unit, coupled to the output bus of each processor unit and each associated mask register, for masking the output bus bits with bits in the mask register of each processor unit and logically combining the resulting masked bits from each processor unit into an output bus of n bits in one computer operation.

10 Claims, 5 Drawing Sheets

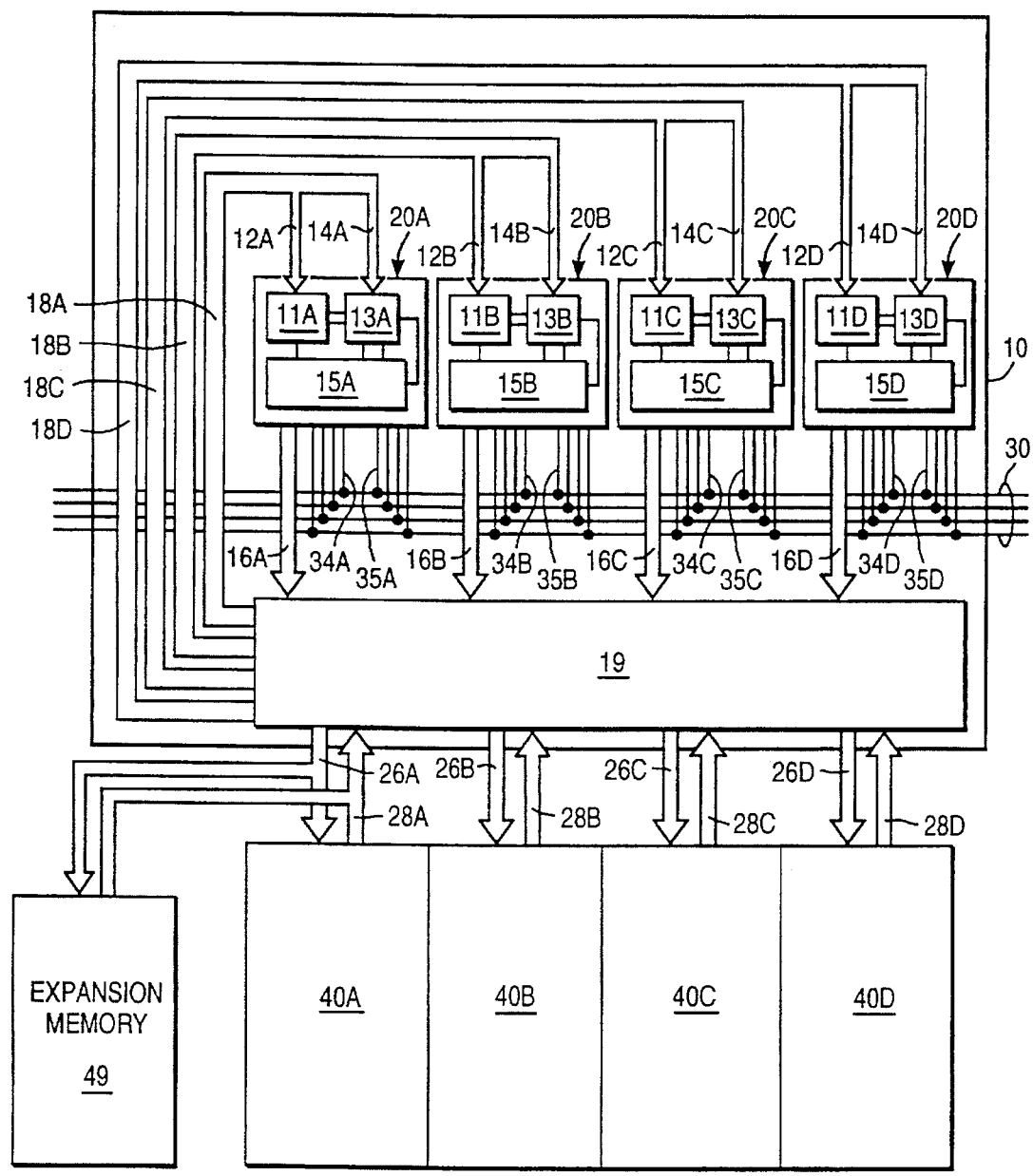
FIG_1

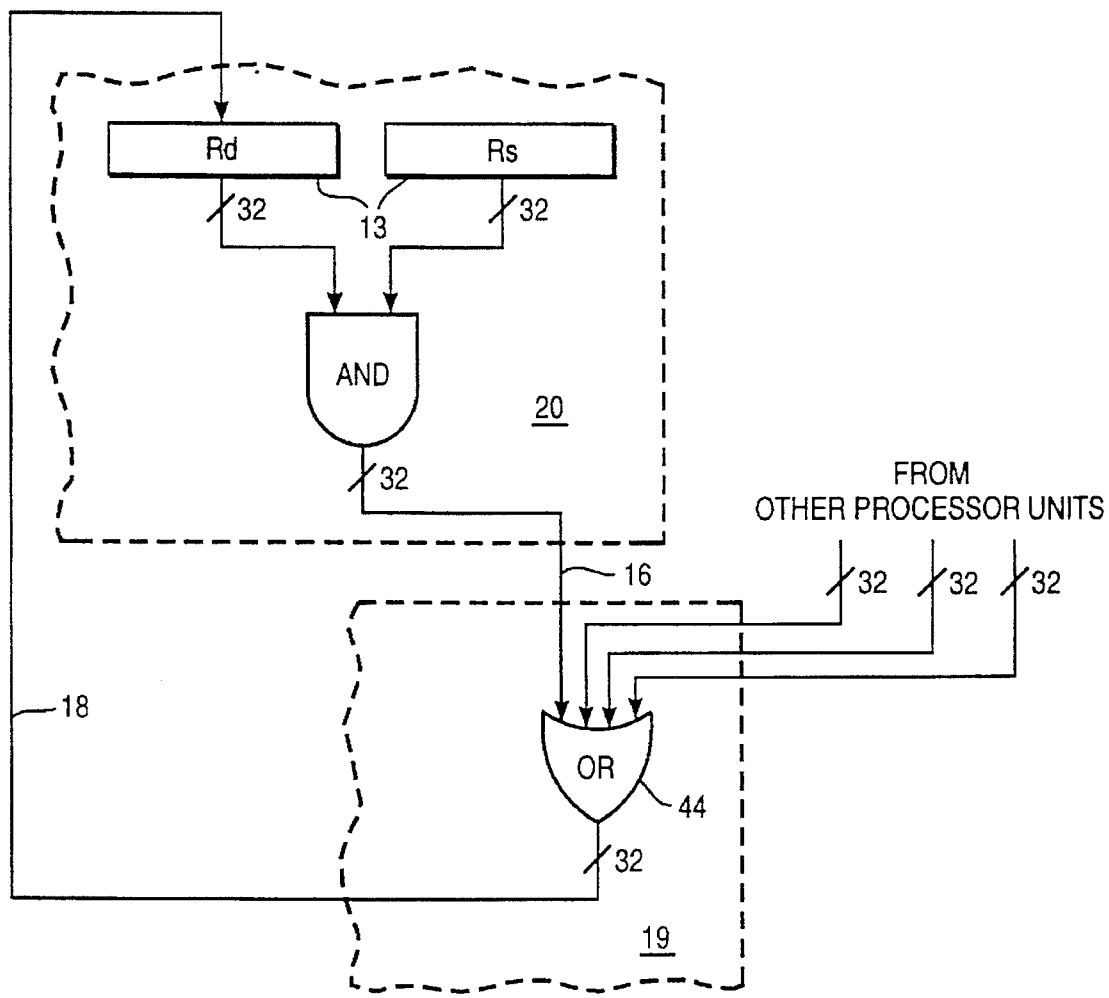

FIG_2

Opcode Definition: for Bitmerge Instruction

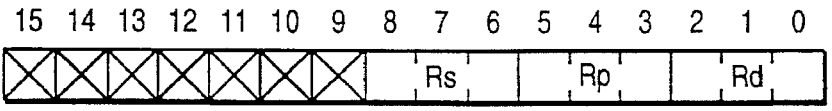

Instruction Definition:

Merge bits of register Rd indicated by mask register Rs with participating processors as indicated by Rp. Each participating processor presents the logical AND of its data in Rd and the mask value in Rs, and each 32 bit value is logically ORed to create the result data. The result data is stored into Rd of each participating processor. Rd identifies all processors in a node participating in the merge; Rp[n] set indicates processor n is participating in the merge. Processor will synchronize and wait until all other processors participating in the merge are ready.

FIG_3

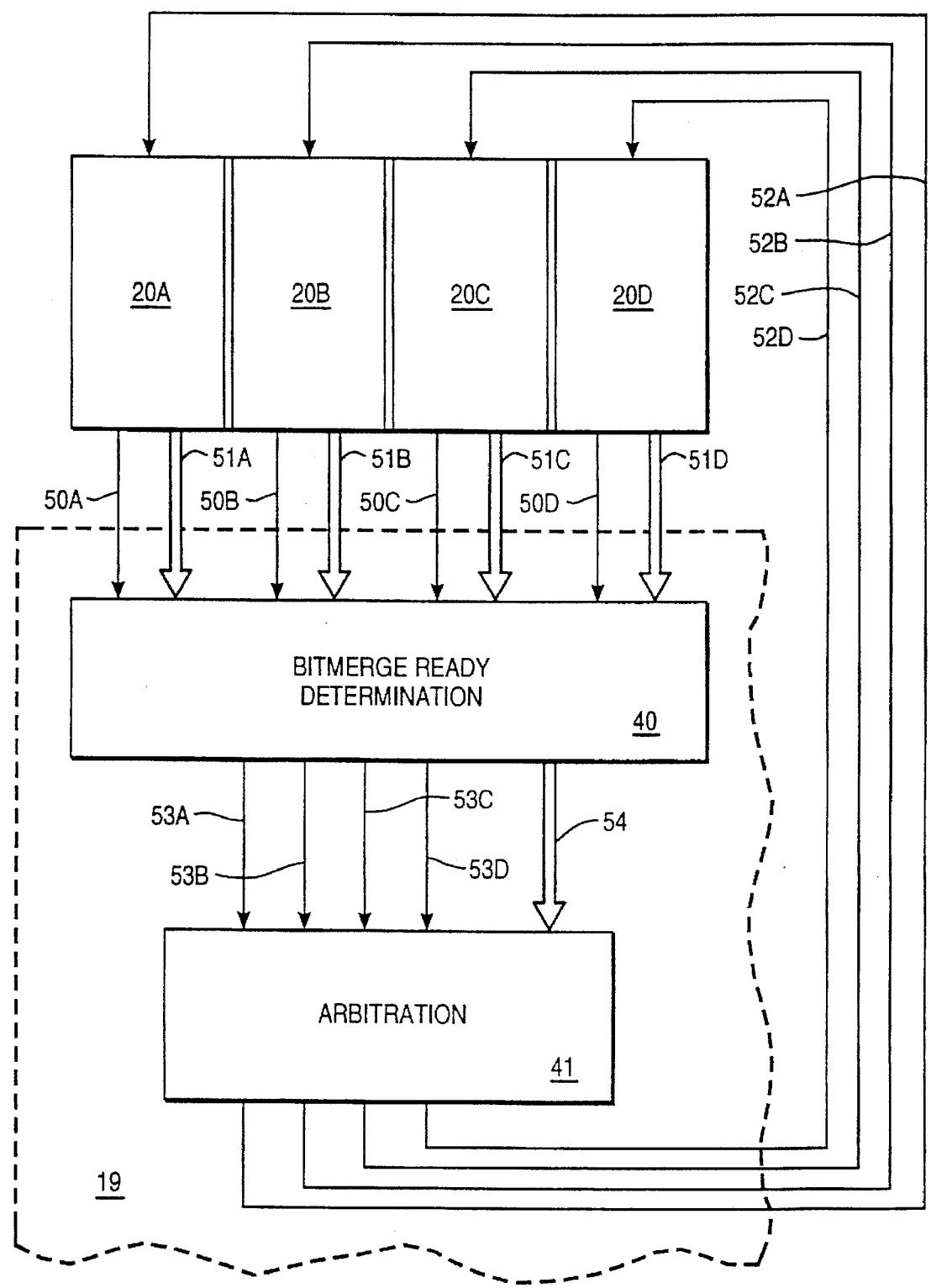
FIG_4

```
P0BitMergeRdy = P0reqBitMerge
            & P1reqBitMerge  &  (P0OBAx[3:0] = = P1OBAx[3:0])
            #  !P0OBAx[1])
            & P2reqBitMerge  &  (P0OBAx[3:0] = = P2OBAx[3:0])
            #  !P0OBAx[2])
            & P3reqBitMerge  &  (P0OBAx[3:0] = = P3OBAx[3:0])
            #  !P0OBAx[3])

P1BitMergeRdy = P1reqBitMerge
            & P0reqBitMerge  &  (P1OBAx[3:0] = = P0OBAx[3:0])
            #  !P1OBAx[0])
            & P2reqBitMerge  &  (P1OBAx[3:0] = = P2OBAx[3:0])
            #  !P1OBAx[2])
            & P3reqBitMerge  &  (P1OBAx[3:0] = = P3OBAx[3:0])
            #  !P1OBAx[3])

P2BitMergeRdy = P2reqBitMerge
            & P0reqBitMerge  &  (P2OBAx[3:0] = = P0OBAx[3:0])
            #  !P2OBAx[0])
            & P1reqBitMerge  &  (P2OBAx[3:0] = = P1OBAx[3:0])
            #  !P2OBAx[1])
            & P3reqBitMerge  &  (P2OBAx[3:0] = = P3OBAx[3:0])
            #  !P2OBAx[3])

P3BitMergeRdy = P3reqBitMerge
            & P0reqBitMerge  &  (P3OBAx[3:0] = = P0OBAx[3:0])
            #  !P3OBAx[0])
            & P1reqBitMerge  &  (P3OBAx[3:0] = = P1OBAx[3:0])
            #  !P3OBAx[1])
            & P2reqBitMerge  &  (P3OBAx[3:0] = = P2OBAx[3:0])
            #  !P3OBAx[2])
```

FIG_5A

```
P0BitMergeOk = P0BitMergeRdy;
P1BitMergeOk = P1BitMergeRdy &
            (!P0BitMergeOk # P1OBAx[0]);
P2BitMergeOk = P2BitMergeRdy &
            (!P0BitMergeOk & P1BitMergeOk
            # P2OBAx[0]
            # P2OBAx[1] & P1BitMergeOk);
P3BitMergeOk = P3BitMergeRdy &
            (!P0BitMergeOk & P1BitMergeOk & !P2BitMergeOk
            #P3OBAx[0]
            #P3OBAx[1] & P1BitMergeOk
            #P3OBAx[2] & P2BitMergeOk);
```

FIG_5B

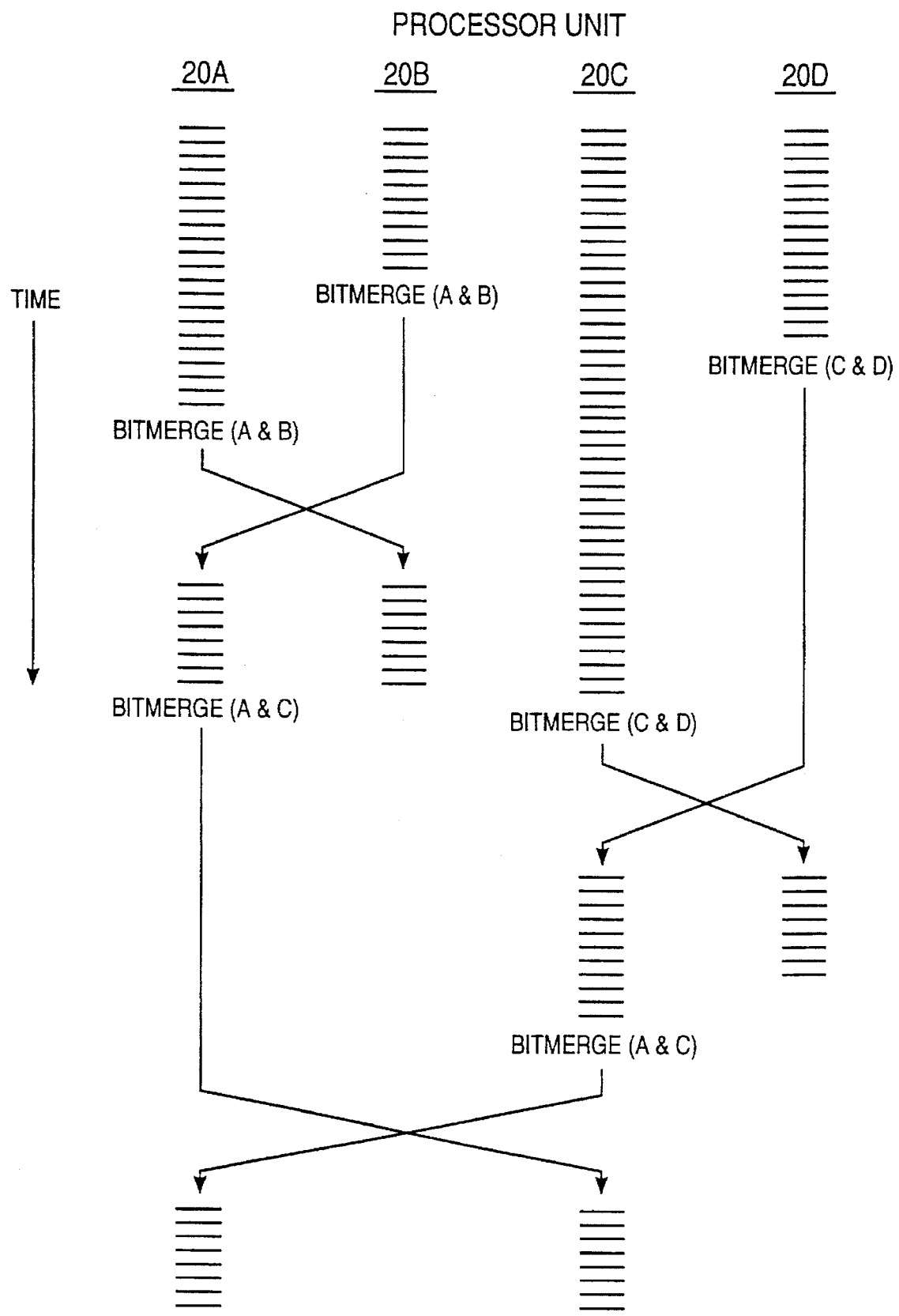
FIG_6

HIGH SPEED MASK AND LOGICAL COMBINATION OPERATIONS FOR PARALLEL PROCESSOR UNITS

This is a continuation of application Ser. No. 08/163,460 filed Dec. 6, 1993 U.S. Pat. No. 5,499,376.

BACKGROUND OF THE INVENTION

The present invention is related to the field of computer architecture and organization and, more particularly, to the high speed operation and synchronization of processor units operating in parallel.

A general goal for computers is faster and faster operation. One solution has been to develop individual processor units with higher operating speeds. Other solutions have been to develop computers with multiple processor units operating in parallel. Compared to a computer with a single processor, parallel computers have not had the desired increase in operating speeds as might be expected. As the number of parallel processor units have increased, parallel processing has become much more complex and the marginal increase in operating speeds with additional processor units has fallen.

Certain types of data processing are particularly suitable for parallel processors. So-called "number crunching" and graphics calculations are examples. Often processing calls for the logical merging of several calculations into a single result. For example, such logical merging from several sources could be used to create an address to a look-up table for complex functions. Several pixel values could be logically merged into a single pixel value for video image storage. The parallel processors could be performing logic simulation in which the operation of a multitude of logic AND and OR gates could be replaced by a logical merge operation.

This leads to the synchronization of operations between the parallel processors, which has been one of the impediments to high speed parallel processing. Synchronization between parallel processor units is a requirement in parallel processor computers to keep one processor from getting too far ahead (or behind) the other processor. For example, typically parallel processor units receive data processed by other units to continue processing. Synchronization forces the parallel units to stay in step with each other and not to outrun the required data.

The present invention offers a bitmerge operation by which the output data of multiple parallel processor units are synchronized and merged at high speed. Once the processor units have their data ready, the bitmerge operation is performed in a single operation.

SUMMARY OF THE INVENTION

The present invention provides for a computer system having a plurality of processor units which are connected for parallel processing. Each processor unit has a plurality of registers, each capable of holding a plurality of bits. Each of the registers in a processor unit are connected to an execution unit so that a plurality of bits in a selected register in a selected one or combination of processor units can be masked.

The computer system also has a bus unit connected to each of the processor units. The bus unit has circuits connected to the execution units of each of the processor units said masking means for logically combining the masked bits from a selected register in the selected one or combination of processor units into a plurality of parallel output bits in the single operation. The computer system further provides for circuit connections so that the logically combined bits are returned back to the selected register in the selected one or combination of processor units within the same operation. In the computer system according to the present invention, the operation is performed in a single clock cycle.

BRIEF DESCRIPTION OF THE DRAWINGS

A clearer understanding of the present invention may be achieved by a perusal of the following description of specific embodiments with reference to the following drawings:

FIG. 1 is a block diagram of an integrated circuit having multiple processor units implementing the present invention;

FIG. 2 is a general logic diagram illustrating the masking operation and merging operation of several processor units of FIG. 1;

FIG. 3 lists the instruction for the bitmerge operation of the present invention;

FIG. 4 is a general block diagram of the elements within the bus unit of FIG. 1 which handle the bitmerge operations according to the present invention;

FIG. 5A is a listing of the logic equations which implement the bitmerge operations in the bitmerge ready determination block shown in FIG. 4; FIG. 5B is a listing of the logic equations which implement the bitmerge operations in the arbitration block shown in FIG. 4; and FIG. 6 is a symbolic representation of a program being executed within the processor units shown in FIG. 1 to illustrate the bitmerge operation according to the present invention.

DESCRIPTION OF PREFERRED EMBODIMENT(S)

FIG. 1 is a block diagram of four processor units 20A–20D which are connected in parallel on an integrated circuit 10. Many similar elements are associated with each of the parallel processor units 20A–20D and the association to a particular processor unit is indicated by a letter suffix, A–D, to a reference numeral. In the following description where a particular element is referenced, the reference numeral including the letter suffix is used. Where an element is being generally described, a reference numeral with no letter suffix is used and it should be understood that the description refers to the subject element in the context of its associated processor unit. Of course, where an element has no letter suffix, only a reference numeral is used.

Each processor unit 20 has an instruction unit 11 which receives instructions on a instruction path 12, a set of eight 32-bit registers 13 which receives data from a data path 14, and an execution unit 15 which executes the instruction in accordance with the control signals from the instruction unit 11.

Each of the processor units 20 is connected to a bus unit 19 by 32-bit wide paths 16 and 18. Data moves from the processor unit 20 to the bus unit 19 along the data path 16; data, including instructions, returns from the bus unit 19 to each processor unit 20 along the data path 18. In FIG. 1, the return path 18 is illustrated as being split into the instruction path 12 and the data path 14. In fact, the return path 18 is connected to a multiplexer (not shown) in each of the processor units 20. The multiplexer, in response to control signals, selects the instruction unit 11 or the register set 13 as the destination of the data on the return path 18.

The bus unit 19 is connected by 32-bit wide data paths 26 and 28 for each of the processor units 20 to a memory 40. As shown, the bus unit 19 is part of the integrated circuit 10 and the memory 40 is not. Additional or expansion memory 49 is available through a port connected to one of the processor units 20. In FIG. 1, the expansion memory is connected through the data paths 26A and 28A. The expansion memory 49 may be in the form of semiconductor memory, disk memory, and the like.

The processor units 20 are each connected to a set of four signal lines 30 as shown in FIG. 1. Each processor unit 20 is connected to each signal line 30 by a line 34 which can set the signal level of the signal line and a second line 35 which can monitor the signal level of the signal line. These signal lines operate in synchronization operations, which are different from the bitmerge operation synchronization described below, and are detailed in U.S. Ser. No. 08/163,442, filed of even date and assigned to the present assignee now U.S. Pat. No. 5,499,376.

Each of the signal lines 30 is also connected to input/output pins (not shown) of the integrated circuit 10. Thus several of the integrated circuits 10 may be coupled in parallel so that the processors 20 in each integrated circuit 10 are connected in parallel and that each processing unit 20 in each integrated circuit 10 is connected in common to each of the signal lines 30. The integrated circuits 10 may be connected together to create a computer having 4 by N processor units, where N is the number of integrated circuits.

In the bitmerge operation each processor unit 20 which is participating in the operation logically combines the bits in the two registers in the set 13 for a masking operation. The bus unit 19 receives the resulting masked output bits from each of the participating processor units 20 from their data paths 16, logically combines these bits by a logical OR operation, and returns the results along the return data path 18 to each of the participating processor units 20.

FIG. 2 illustrates the masking operation and combination operation by a general logic diagram with the processor units of FIG. 1. In FIG. 2, dotted lines are used to illustrate the locations of elements which perform the described functions. Wavy dotted lines are used to indicate that only some of the elements of the processor unit 20 and bus unit 19 are shown. For each processor unit 20, which has been designated to participate in a bitmerge operation, two sets of 32 bits of the output path 18 are logically ANDed together. One set of 32 bits is supplied from one of the registers 13, designated Rd, and the other set of 32 bits is supplied from another of the registers 13, designated Rs. The Rs register is considered the mask register for the Rd register. The logical AND operation is performed by the execution unit 15, drawn here as a large logical AND gate, of the processor unit 20. Since it is well known to logic circuit and computer system designers how to design execution units to perform an AND function between the contents of two registers, no more is said about the details of the masking operation.

The resulting masked 32 bits from the processor unit 20 are then logically ORed with the resulting masked bits from the other designated processor units in the bus unit 19. Alternatively, the resulting masked bits may be logically EX-ORed together. As shown in FIG. 2, the bus unit 19 has a logic unit 44 which performs an OR, or EX-OR, logic operation, on each of the 32 bits with the other bits from each of the processor units 20 on their respective data paths 16. The design of such a logic unit 44 is well known to logic circuit and computer system designers. The results of the OR, or EX-OR, operation are returned to the Rd register in the register set 13 of each of the participating processor units 20 by the return data path 18.

All of these operations in the bitmerge operation are completed in a single operation, which is performed in one clock cycle, and all of the processor units 20 participating in the bitmerge operation are synchronized. That is, each participating processor unit waits until the last participating processor is ready with its masked output bits before the bitmerge operation is completed.

FIG. 3 illustrates the opcode fields of the bitmerge instruction to a processor unit 20. Besides the 7-bit opcode field itself, the instruction has three 3-bit fields, Rs, Rd and Rp. The Rs field designates which of the eight registers 13 in the register set is the mask register. The Rd field designates which of the remaining eight registers 13 is the source and destination register, i.e., the register from which its bits are masked by the bits of the Rs register, logically Ored (or EX-Ored) with the masked bits of the other participating processor units, and to which the resulting bits returned.

The Rp field is a pointer to one of eight registers 13 which designates the processor units 20 which will participate in the bitmerge operation. Each bit location in in the register 13, specified by the Rp field, represents the participation of a particular processor unit. The register 13 is 32-bits wide and hence up to 32 processor units may be designated. This accommodates the connection of a plurality of integrated circuits 10 in parallel, as described above, or the design of the integrated circuit 10 with more processor units. In the description herein, only four of the processor units 20 are used. Hence only the least significant four bits in the register 13 pointed by the Rp field are used.

FIG. 4 is a block diagram of the elements in the bus unit 19 which implement the bitmerge operations. The bus unit 19 receives two sets of control signals from each processor unit. The first set is carried by a single bitmerge request control line 50 which is set, i.e., logic 1, when the particular processor unit 20 is ready to perform its bitmerge instruction. For example, upon executing a bitmerge instruction, the processor unit 20C logically AND's the contents of the two registers 13 designated by the instruction. The masked results are placed on the data path 16 and the control line 50C is set.

The second set of control signals identifies the processor units 20 which are participating in the bitmerge operation. These signals are the least significant four bits in the register 13 pointed by the Rp field in the bitmerge instruction being executed by the processor unit 20. The control signals are carried on four processor ID control lines 51 to the bus unit 19. Thus, continuing the example of the previous paragraph, the control lines 51C carry the least significant four bits in the register 13 pointed by the Rp field in the bitmerge instruction being executed by the processor unit 20C.

The first and second set of control signals from each of the processor units 20 are received by a bitmerge ready determination block 40 in the bus unit 19. The block 40 determines which of the processors 20 are ready to participate in a bitmerge operation. To handle the situation where combinations of different processor units 20 are simultaneously ready for different bitmerge operations, an arbitration block 41 receives four bitmerge ready control lines 53 and some of the processor ID control lines 51 on a control line path 54 from the bitmerge ready determination block 40. The particular processor ID control lines 51 in the path 54 are identified below in the discussion of the operation of the arbitration block 41. As the name implies, the arbitration block 41 issues the bitmerge OK signals to the processor units 20 on control lines 52. The bitmerge OK signal informs the particular processor unit 20 to accept the data on its return path 18 and to place the contents in the register 13 designated by the Rd field of the bitmerge instruction being executed by that processor unit 20.

The logic operations of the bitmerge ready determination block 40 and the arbitration block 41 are somewhat complicated. Hence, FIG. 5A is a listing of the logic equations describing the logical functions and operations of the block 40 and FIG. 5B is a listing of the logic equations describing the logical functions and operations of the block 41.

In the notation of FIGS. 5A and 5B, the suffix A–D attached to each of the four processor units 20 are replaced by a numerical designation 0–3 respectively. For example, P0 refers to processor unit 20A, P1 to processor unit 20B and so forth. The "&" symbol refers to a logical AND operation; the "#" symbol refers to a logical OR operation; and the leading "!" symbol refers to a logical NOT operation. The "==" symbol refers to a logical comparison, i.e., when the signals on both sides of the symbol are the same value, the result is a logical 1; otherwise, the result is zero.

With respect to the bitmerge ready determination block 40, the P0BitMergeRdy signal refers to the signal on the bitmerge ready control line 53A; P1BitMergeRdy signal refers to the signal on the bitmerge ready control line 53B, the P2BitMergeRdy signal refers to the signal on the bitmerge ready control line 53C, and the P3BitMergeRdy signal refers to the signal on the bitmerge ready control line 53D. The P0reqBitMerge signal refers to the signal on the bitmerge request control line 50A, the P1reqBitMerge signal refers to the signal on the bitmerge request control line 50B, and so forth. The OBAx[3:0] refers to the four processor ID control lines 51 from each processor unit 20. Thus, P3OBAx[3:0] refers to the four processor ID control lines 51 from the processor unit 20D.

The operation of the bitmerge ready determination block 40 can be explained by an analysis of the one BitMergeRdy signals. Taking the BitMergeRdy signal for the processor unit 20A, P0BitMergeRdy, one can see that the processor unit 20A is ready for bitmerge if: 1) its own bitmerge request signal is set; and 2) if the bitmerge request from processor unit 20B is set, the processor unit 20B wants to participate in the same bitmerge operation as processor unit 20A (P0OBAx[3:0]==P1OBAx[3:0]), or the processor unit 20B is not to participate in the bitmerge operation with processor unit 20A at all (!P0OBAx[1]); and 3) if the bitmerge request from processor unit 20C is set, the processor unit 20C wants to participate in the same bitmerge operation as processor unit 20A (P0OBAx[3:0]==P2OBAx[3:0]), or the processor unit 20C is not to participate in the bitmerge operation with processor unit 20A at all (!P0OBAx[2]); and 4) if the bitmerge request from processor unit 20D is set, the processor unit 20D wants to participate in the same bitmerge operation as processor unit 20A (P0OBAx[3:0]==P3OBAx[3:0]), or the processor unit 20D is not to participate in the bitmerge operation with processor unit 20A at all (!P0OBAx[3]). The BitMergeRdy signals for the other processor units 20B–20D operate in a similar fashion.

The arbitration block 41 issues signals on the bitmerge OK control lines 52 to each of the processor units 20 to proceed with a bitmerge operation. The block 41 typically comes into operation when two bitmerge operations are ready to be performed. The block 41 decides which operation has priority to proceed. As indicated by the logic equations in FIG. 5B, priority is given to the processor unit 20A, then to unit 20B and so forth. Thus the logic equations become progressively more complicated from P0BitMergeOk to P3BitMergeOk as more conditions are placed upon the processor units 20 with the lower priority.

Using the bitmerge OK line 52C, as an example, one can determine that the processor unit 20C will be given the signal to proceed (P2BitMergeOK is logic 1) if: 1) the processor unit 20C is ready for a bitmerge (P2BitmergeRdy is set); and 2) neither processor units 20A and 20B have been given the signal to proceed with a bitmerge operation (!P0BitMergeOk & !P1BitMergeOk), or processor unit 20C is to proceed with a bitmerge operation with processor unit 20A (P2OBAx[0]), or processor unit 20C is to proceed with a bitmerge operation with processor unit 20B, which has been given the signal to proceed (P2OBAx[1] & P1BitMergeOk). The signal on the bitmerge OK line 52D is governed by even more conditions.

FIG. 6 illustrates how the bitmerge instructions are used by the parallel processor units 20 in a representative program. An instruction executed by a particular processor unit 20 is represented by a horizontal line in each column under the particular processor unit. A vertical line in a column means that the particular processor unit is stalled. Crossing lines symbolize a bitmerge operation. Time is downward.

As represented in FIG. 6, the processor unit 20B executes the first bitmerge instruction, which is to be performed between the processor units 20A and 20B. Since the processor unit 20A is not ready for a bitmerge, the processor unit 20B stalls. In the meantime, the processor unit 20A continues executing instructions until it reaches the bitmerge instruction. At that time the bitmerge operation between processor units 20A and 20B is performed, after which both processor units 20A and 20B resume their subsequent instructions.

As similar event has occurred with respect to processor unit 20D, which encounters a bitmerge instruction shortly after the processor unit 20B encounters the bitmerge instruction described above. Like the processor unit 20B, the processor unit 20D stalls since its designated partner, the processor unit 20C, is not ready for a bitmerge operation at the time. The bitmerge operation between the processor units 20C and 20D finally occurs when the unit 20C reaches its bitmerge instruction, and both processor units 20C and 20D resume instruction execution.

In the meantime, before the processor unit 20C has reached its first bitmerge instruction, the processor unit 20A has executed its second bitmerge instruction which indicates that the processor unit 20C is to participate in the bitmerge operation. The processor unit 20A stalls until the processor unit 20C has executed its second bitmerge instruction, at which point a bitmerge with the units 20A and 20C is performed.

For purposes of explanation, the exemplary program above did not use bitmerge operations with three or four processor units 20. As explained above, the computer system is fully capable of such bitmerge operations. Furthermore, bitmerge operations can be used to distribute data into the registers 13 of the processor units 20 in a single clock cycle. For example, if all four processor units 20 are designated to participate in a bitmerge operation, but three of the processor units 20 do not contribute any data to the OR logic function by being masked out, the data from the remaining processor unit 20 will be distributed to a register 13 in each of the processor units. Thus the bitmerge operation in accordance with the present invention has many subtle and powerful features, which are very useful in parallel processing.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. A computer system having a plurality of processor units, said processor units connected in parallel to a memory for parallel processing, each processor unit having:

an instruction unit;

a plurality of registers, each register holding a plurality of bits; and an execution unit connected to each of said plurality of registers, said execution unit in a selected processor unit masking a plurality of bits in a selected register responsive to control signals from an instruction unit in said selected processor unit; and said computer system further comprising a logic circuit, connected to said execution unit in each processor unit, logically combining a plurality of masked bits of said selected register in each selected processor unit into a plurality of output bits in a single computer operation.

2. A computer system as in claim 1 wherein said single computer operation occurs in one clock cycle.

3. A computer system as in claim 1 wherein said combining means is connected to said plurality of registers in each of said processor units, said combining means transmitting said plurality of output bits to each selected register in each selected processor unit in said single computer operation.

4. In a computer system having a plurality of processor units, each processor unit having an instruction unit, a plurality of registers, and an execution unit, each register of said plurality of registers holding a plurality of bits, each processor unit connected in parallel to a memory through a bus unit, a method of operating said computer system comprising:

selecting a first register in at least one processor unit;

masking bits in said first selected register; and logically combining masked bits of said first selected register in said at least one processor unit with masked bits of any other first selected registers in other processor units into a plurality of output bits in a single computer operation.

5. The operating method of claim 4 further comprising:

storing said plurality of output bits in each first selected register in said single computer operation.

6. The operating method of claim 5 wherein said selecting step further comprises:

selecting a second register in said at least one processor unit; and said masking step further comprises:

logically ANDing said bits in said first selected register with bits in said second selected register.

7. The operating method of claim 4 wherein said logically combining step comprises logically ORing said masked bits of said first selected register in said at least one processor unit with said masked bits of any other first selected registers in other processor units.

8. The operating method of claim 4 wherein said logically combining step comprises logically EX-ORing said masked bits of said first selected register in said at least one processor unit with said masked bits of any other first selected registers in other processor units.

9. The operating method of claim 4 comprising ordering said logically combining step when combinations of masked bits of a plurality of selected first registers are to be logically combined.

10. A computer system having a plurality of processor units, each processor unit connected to other processor units for parallel and independent processing, each processor unit processing instructions having no required relationship to instructions processed in other processor units, each of said processor units having:

an instruction unit;

a plurality of registers, each register holding a plurality of bits; and an execution unit connected to each of said plurality of registers, said execution unit in a selected processor unit masking a plurality of bits in a selected register responsive to control signals from an instruction unit in said selected processor unit; and said computer system further comprising a logic circuit, connected to said execution unit in each processor unit, logically combining a plurality of masked bits of said selected register in each selected processor unit into a plurality of output bits in a single computer operation.

* * * * *